United States Patent [19]
Sague

[11] 4,065,192
[45] Dec. 27, 1977

[54] RACE INSERT FOR BEARING
[75] Inventor: John E. Sague, Philadelphia, Pa.
[73] Assignee: Messinger Bearings, Inc., Philadelphia, Pa.
[21] Appl. No.: 706,756
[22] Filed: July 19, 1976
[51] Int. Cl.² .......................................... F16C 33/58
[52] U.S. Cl. ................................ 308/215; 308/219
[58] Field of Search ............... 308/216, 219, 207 R, 308/189 R, 198, 234

[56] References Cited
U.S. PATENT DOCUMENTS

| 3,099,073 | 7/1963 | Olson | 308/216 X |
| 3,361,500 | 1/1968 | Pohler | 308/216 |
| 3,361,501 | 1/1968 | Messinger et al. | 308/219 |
| 3,975,067 | 8/1976 | Martin | 308/216 |

Primary Examiner—Joseph F. Peters, Jr.
Assistant Examiner—Gene A. Church
Attorney, Agent, or Firm—Eugene E. Renz, Jr.

[57] ABSTRACT

In a bearing assembly including an annular member having a load carrying surface, the improvement comprising means defining a pocket in said annular member having a circumferentially extending generally radially directed wall and an axially extending surface projecting from said radial wall outwardly toward the end face of said annular member, said axially extending surface being inwardly tapered at a predetermined angle, a ring like insert having a peripherally extending surface defining a raceway and radial and axial surface portions complementing the radial and axial surface portions of said annular member, said axially extending surface portions of said member and insert being suitably dimensioned to provide an interference fit when assembled.

6 Claims, 4 Drawing Figures

U.S. Patent   Dec. 27, 1977   4,065,192
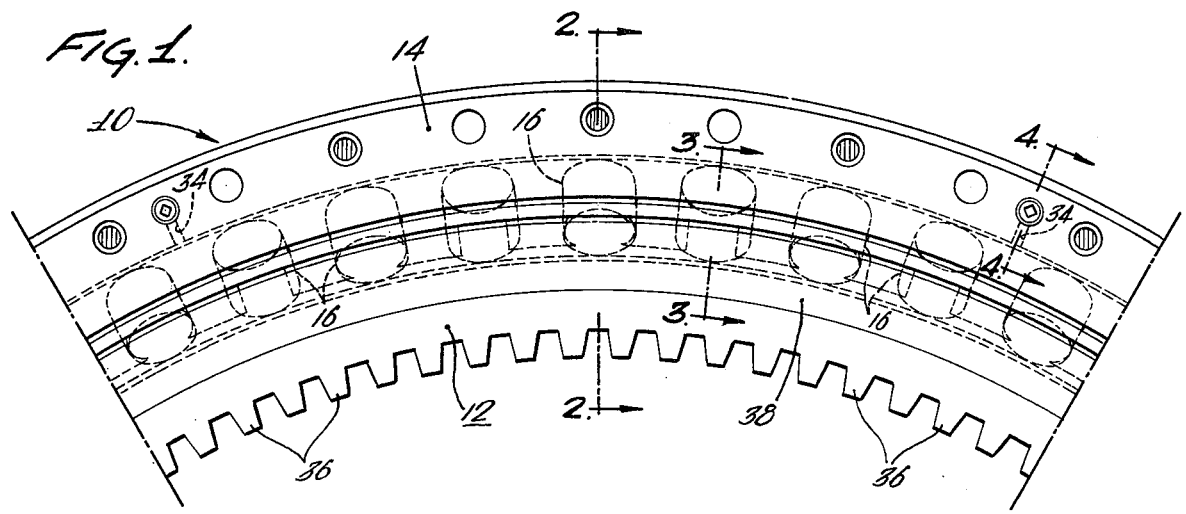
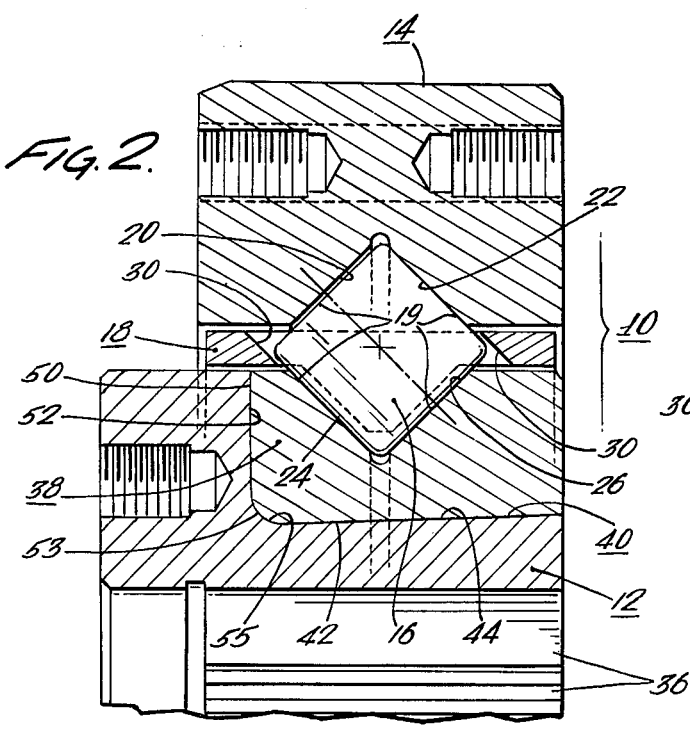
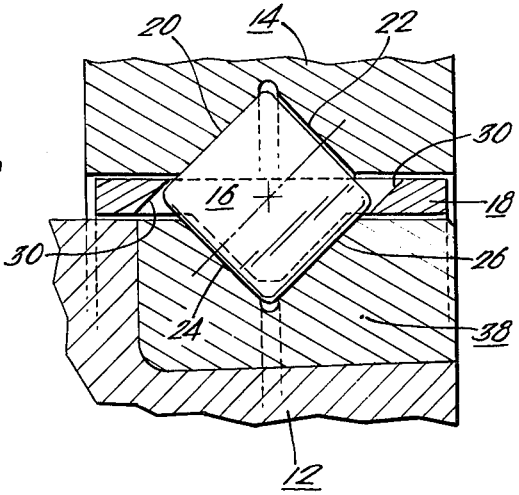
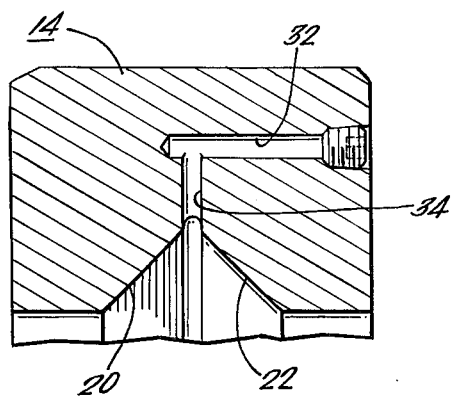

RACE INSERT FOR BEARING

BACKGROUND OF THE INVENTION

The present invention relates to improvements in anti-friction bearings and more particularly to a novel through hardened race insert defining at least one of the raceways for a bearing.

The present invention is designed to increase the so-called service life of ball and roller bearings. The term "life" as it is customarily applied to bearings means that period of service which is limited by fatigue phenomena. "Life" is generally measured in number of revolutions of the bearing or in number of hours of operation at a certain speed of rotation. Thus, each bearing assembly has a limited life period even when it is effectively protected, well lubricated, and otherwise properly handled. Under these circumstances all cause of damage are eliminated except one, the fatigue of the material due to repeated stress under rotation. The effect of this fatigue is the so-called flaking, which starts as a crack and develops into a spalled area on one or the other of the load carrying surfaces, that is, on the balls or rollers or the raceway. Therefore, fatigue is ultimately unavoidable but the number of revolutions the bearing may make before flaking starts is a function of the bearing load. The various types of bearing failure usually are centered in the contacting load carrying surfaces, that is, the balls or rollers or raceways. In some applications, the balls or rollers are easily replaceable. However, in most instances where the raceway surface of the inner and outer ring becomes defective due to fatigue, the entire assembly is discarded.

The present invention is designed to extend the "life" of bearing assemblies by providing an insert for at least one of the bearing rings forming the raceway of the bearing and which is a separable part of at least one of the bearing rings. In this manner when the raceway exhibits fatigue indicia, the race insert may be removed and replaced and thereby extend the useful service life of the other elements of the assembly. The invention contemplates modification of conventional bearing assemblies now in use to receive a raceway insert in accordance with the present invention. In addition to extending the useful life of a bearing assembly, the provision of a replaceable raceway insert provides certain economies in the cost of the overall assembly. For example, the insert may be made of a high grade bearing steel whereas the remainder of either the inner or outer ring may be made of a low grade, less expensive steel or a non-ferrous alloy. Furthermore, the low grade steel may be easier to machine and finish for example, particularly in the case where the inner and outer ring is designed for a special purpose, as for example, in applications where the bearing ring has a gear configuration on its annular surface opposite the raceway.

The concept of a raceway insert or a multi-layer bearing ring is not new per se. For example, in the bearing assembly illustrated in the Olson U.S. Pat., No. 3,099,073, issued July 30, 1963 for Method of Making Anti-Friction Bearing Assembly, the inner and outer raceways are defined by inserts which are seated in generally triangular-shaped channels forming part of an outwardly opening groove in the inner ring and a similarly shaped inwardly opening groove in the outer ring. In each ring, the inserts comprise a pair of axially spaced members firmly seated in the three sided corner portion of the opening in the ring by an annular keeper key disposed between the inserts and secured to the ring by a series of circumferentially spaced countersunk screws. The assembly of the inserts in the rings is comparatively complicated and involves careful attention to finishing procedures in order to maintain the close tolerences required for assembling the parts. In Columns 4 and 5 of the patent, the particular assembly method is described in detail. Thus, the end product is a highly specialized assembly which is comparatively costly to manufacture. Furthermore, as pointed out in the Olson specification, each raceway is comprised of a plurality of inserts assembled end-to-end and as a result, there are gaps or seams in the raceway surface which are objectionable particularly in high speed bearing applications. By contrast, the insert of the present invention is a continuous annular member and the pocket in the ring for the insert extends axially to one axial end face of the ring to facilitate assembly of the insert from an axial end face of the ring. The insert thus may be shrink fitted to the ring and accordingly, the confronting surfaces of the insert and the ring do not have to be maintained within the critical close tolerences as compared to the inserts of the Olson patent. Furthermore, in the present instance, the insert and pocket have complementary tapered axially extending surfaces to lock the parts against axial displacement when the bearing is under load thereby obviating the need for additional fastening elements such as the keeper key and countersunk screws of the Olson assembly.

The Knowles U.S. pat. No. 1,505,352, which issued Aug. 19, 1924 on an anti-friction bearing shows an assembly wherein the inner and outer rings are multipiece members. The anti-friction bearing illustrated is the type having two rows of rolling elements wherein the inner and outer rings for each of the rows is mounted in a sleeve-like casing or the like. The casing is in the form of a thin tubular sleeve having in the case of the inner ring a pair of radially directed flanges at its outer ends to support the bearing rings and in the case of the outer ring a central rib for spacing the two outer rings for each row of rolling elements. Knowles does not recognize the problem of raceway failure and does not disclose or suggest that the race rings are separable for replacement purposes. Furthermore, Knowles does not disclose or suggest a specific insert arrangement as proposed by the present invention or the easy and economical means for assembling the insert in an inner or outer ring of a bearing assembly.

Even though the concept of the present invention has application to all types of bearings, the invention is described herein in connection with a so-called X-type bearing. A typical X-type bearing assembly is illustrated in Messinger U.S. Pat. No. 3,361,501 issued Jan. 2, 1968 and as illustrated therein, both inner and outer race rings having confronting angularly disposed raceways which define an annular space therebetween for a plurality of rollers having cylindrical load carrying surfaces and a cage for guiding and circumferentially spacing the rollers in the annular space. The rollers are of a predetermined geometry having a diameter to length relationship so that when they are inserted in the annular space between the rings, the generally cylindrical load carrying surface of some of the rolling elements are oriented to carry a load application from one axial direction on the confronting opposite raceways of the inner and outer rings and other rollers are oppositely oriented so that they contact and carry load on the raceways of the inner and outer rings disposed 90° to said first raceways. As noted above, the raceways tend to wear over a given period of use under load. Accordingly, the aim of the present invention is to provide a novel race insert illustrated herein for the inner ring of an X-type bearing which is of more durable construction and which is easy and economical to assemble to the inner ring and which is easily replaced when necessary. The race insert comprises a comparatively small part of the entire assembly, and thus, provides the advantage of easy replacement at a relatively low cost and extension of the usefulness of the major portion of the bearing assembly.

SUMMARY OF THE INVENTION

In accordance with the present invention, there is provided a race insert for a ring of the bearing assembly which seats in a pocket of one of the rings, for example, the inner ring and is adapted to be assembled thereto by a combined method comprising shrink fitting to the inner ring and a supplemental bond of a commercially available metal bonding agent between the race insert and the pocket in the inner ring. In order to seat the ring against axial displacement to firmly secure the race insert against movement when axial loads are applied, the axially extending confronting surfaces of the pocket and insert are preferably tapered radially inwardly from the open end of the pocket thereby providing an arrangement resisting unseating of the insert when axial loads are applied to the bearing in a direction tending to unseat the insert.

BRIEF DESCRIPTION OF THE FIGURES

These and other objects of the present invention and the various features and details of the construction and operation thereof are hereinafter more fully set forth with reference to the accompanying drawing, wherein:

FIG. 1 is a fragmentary side elevational view of an X-type bearing constructed in accordance with the present invention;

FIG. 2 is an enlarged sectional view taken on lines 2—2 of FIG. 1;

FIG. 3 is a fragmentary sectional view taken on lines 3—3 of FIG. 1 showing the position of alternate rollers in the assembly; and FIG. 4 is a fragmentary sectional view taken on lines 4—4 of FIG. 1 showing the lubrication arrangement for the bearing assembly.

DESCRIPTION OF THE PREFERRED EMBODIMENT

Referring now to the drawings and particularly to FIG. 2 thereof, there is illustrated a bearing assembly 10 constructed in accordance with the present invention which comprises an inner and outer relatively rotatable rings 12 and 14 respectively, a plurality of rollers 16 in the annular space between the rings and a cage broadly designated by the numeral 18 having pockets for circumferentially spacing the rolling elements in the annular space in the manner illustrated in FIG. 1. As is conventional in X-type bearings, the raceways are comprised of right angularly disposed surfaces to support the rollers for rotation about their axis at an angle to the axis of the bearing assembly. Thus, the inner and outer rings are arrayed so that the raceways 20 and 26 are in confronting parallel relation and the raceways 22 and 24 are in confronting and parallel relation in the assembled bearing to provide a space 19 of generally square cross section. The rollers 16 are of generally cylindrical shape and of a diameter greater than the axial length so that when they are assembled in the raceways the cylindrical load carrying surfaces engage one pair of the confronting raceways of the inner and outer rings and the axial ends are spaced from the other pair of confronting raceways. In the particular bearing assembly illustrated, alternate rollers are oriented in the same direction with intermediate rollers oriented 90° to the alternate ones. Of course, any combination of orientation is possible and the arrangement will depend on the particular application of the bearing taking into account the magnitude and direction of the applied loads.

The cage 18 is similar to that shown in Messinger U.S. Pat. No. 3,361,501 and comprises a plurality of segments for ease of assembly in the annular space between the inner and outer rings. The cage segments in the assembled bearing are in abutting relation to form a continuous cage. The side edges of the cage segments are beveled as at 30 in an appropriate direction to accomodate the rollers as they are positioned at 90° relative to one another in the assembled bearing. Preferably, the outer ring 14 is provided with a loading port (not shown) for inserting the rollers into the annular space in the fashion shown in the earlier Messinger U.S. Pat. No. 3,361,501. Additionally, as illustrated, the assembly includes conduit means for introducing lubricant to the rollers in the annular space. To this end the outer ring 14 has a plurality of circumferentially spaced axial conduits 32 which have a radial leg 34 communicating with the annular space in the manner shown in FIG. 4. The outer end of the axial port is tapped to receive a plug to close the opening.

In the present instance the inner ring assembly 12 has a plurality of gear teeth 36 formed on its inner periphery. This bearing assembly is adapted for use in a tunnel boring machine wherein the outer ring is supported in a fixed housing and the inner ring gear teeth mesh with the gear teeth of bull collar on the boring tool. The inner ring is suitably rotated by drive means to rotate the boring tool in a conventional manner.

In accordance with the present invention, a raceway insert 38 is provided which seats in a pocket 40 in the inner race ring and as illustrated has the right angularly disposed inner raceways 24 and 26 formed therein. The inner axially extending surface 42 of the insert 38 is reversely tapered to incline inwardly at approximately an angle of between 0° 5' to 0° 10' and as shown, the pocket 40 in the inner ring is formed with a complementary tapered surface 44 so that in the assembled relation, the insert is firmly seated in the inner ring and the tapered surfaces resist axial displacement of the insert by reason of axial loads tending to displace the insert axially to the right relative to the inner ring. The insert has a radial abutment face 50 which confronts and engages the radial wall 52 of the pocket 40. The juncture of the axial and radial walls of the insert 38 is rounded as at 53 to engage in a fillet 55 formed in the pockets.

As noted above, the race insert 38 is preferably made of a high grade bearing steel such as A.I.S.I.52100 bearing steel and the gear ring 12 may be made of a less expensive alloy. The tapered surface of the pocket 40 in gear ring 12 and the surface 42 of the insert 38 are suitably dimensioned to provide an interference fit between the parts in the assembled relation.

Consider now the method for assembling the race insert 38 in the pocket 40 of the inner ring 12. In this instance the insert is heated to a suitable temperature of between 150° - 200° F to afford sufficient expansion of the insert 38 and provide an adequate clearance between the tapered surfaces 42 and 44 so that the insert may be assembled into the pocket 40 from one axial end of the inner ring. The inner ring is maintained at a lower temperature, for example, an ambient temperature and thereafter when the insert is positioned in the pocket and cools sufficiently to contract, is shrink fitted in the pocket in the inner ring. If desired, a suitable commercially available metal bonding agent may be inserted between the confronting surfaces of the insert and the pocket prior to assembly. It is noted that an adhesive is not stricty necessary to provide the desired locking action between the insert and the inner race ring and that generally are suitably dimensioned to provide an interference fit to insure against disassembly of the parts under load conditions. The interferences required to insure good seating of the insert will vary depending for example, on the size of the bearing and can be determined in accordance with standard engineering practices. Of course, in the case where the insert is for the outer ring of the bearing assembly, the outer ring is raised to a suitably high temperature to permit the parts to be assembled in the manner described above.

Even though the invention has been shown and described in connection with an X-type bearing, it is of course to be understood that this is merely by way of illutrating a preferred embodiment of the invention and that the type of insert described above has useful application in other types of bearing assemblies.

I claim:

1. A ring for a bearing assembly having generally parallel inner and outer faces, means defining a pocket in the surface between said faces for an insert having a load carrying surface defining a raceway, said pocket including a circumferentially extending first wall generally parallel to said faces and spaced therebetween, a second circumferentially extending frusto-conical wall which diverges inwardly from one face toward said first wall, an endless annular insert adapted to seat in said pocket having a frusto-conical surface portion confronting and complementing said second wall portion and dimensioned to provide an interference fit therewith.

2. A bearing assembly as claimed in claim 1 including a metal bonding agent between the confronting surfaces of said insert and said pocket.

3. A bearing assembly as claimed in claim 1 wherein said insert is made of a high grade bearing steel and said annular member is made of a less expensive steel alloy.

4. A bearing assembly as claimed in claim 1 wherein the peripherally extending surface of said insert defining said raceway are right angularly disposed raceway sections, each raceway section being disposed at approximately an angle of 45° to the axis of said annular member.

5. A bearing as claimed in claim 1 wherein said second wall portion of said pocket and said frusto-conical surface portion of said insert diverge at an angle of between about 0° 5' to 0° 10'.

6. An X-type bearing assembly comprising inner and outer rings, each of said rings having a pair of circumferentially extending raceways which are disposed at right angular relation to one another and which are arrayed so that one of the raceways of the inner ring confronts and is parallel to one of the raceways of the outer ring and the other raceway of the inner ring confronts and is parallel to the other raceway of said outer ring, a plurality of rollers in the annular space defined by the raceways, each of said rollers having a load carrying surface between its axial end face engaging the raceways, means defining a pocket in at least one of said rings, said pocket including a circumferentially extending, generally radially directed first wall located between the axial end faces of said one ring and a second circumferentially extending, axially directed frusto-conical second wall which diverges inwardly from one axial end face of said ring and an endless annular insert adapted to seat in said pocket including a frusto-conical surface portion confronting and complementing said second wall portion and dimensioned to provide an interference fit therewith.

* * * * *